United States Patent
Aboujaib et al.

(10) Patent No.: US 10,024,446 B2
(45) Date of Patent: Jul. 17, 2018

(54) MULTI-WAY VALVE

(71) Applicant: GE ENERGY PRODUCTS FRANCE SNC, Belfort (FR)

(72) Inventors: Mohamad Maher Aboujaib, Evette Salbert (FR); Philippe Schmitt, Belfort (FR); Jean Louis Vignolo, Valdoie (FR); Ezio Mauricio Pena, Cranvanche (FR); Sven Catrin, Belfort (FR)

(73) Assignee: GE Energy Products France SNC, Belfort (FR)

( * ) Notice: Subject to any disclaimer, the term of this patent is extended or adjusted under 35 U.S.C. 154(b) by 0 days.

(21) Appl. No.: 15/382,125

(22) Filed: Dec. 16, 2016

(65) Prior Publication Data
US 2017/0314691 A1 Nov. 2, 2017

(30) Foreign Application Priority Data
May 2, 2016 (FR) .................... 16 53943

(51) Int. Cl.
| F16K 15/18 | (2006.01) |
| F16K 11/14 | (2006.01) |
| F16K 27/00 | (2006.01) |
| F16K 49/00 | (2006.01) |
| F02C 3/30 | (2006.01) |
| F02C 7/232 | (2006.01) |
| F23R 3/10 | (2006.01) |

(52) U.S. Cl.
CPC .............. *F16K 15/18* (2013.01); *F16K 11/14* (2013.01); *F16K 27/003* (2013.01); *F16K 49/005* (2013.01); *F02C 3/30* (2013.01); *F02C 7/232* (2013.01); *F05D 2220/32* (2013.01); *F23R 3/10* (2013.01); *Y10T 137/86517* (2015.04)

(58) Field of Classification Search
CPC ........ F16K 15/18; F16K 11/14; F16K 27/003; F16K 49/005; Y10T 137/86517
See application file for complete search history.

(56) References Cited

U.S. PATENT DOCUMENTS

| 2,294,636 A * | 9/1942 | Stearns ................. F01D 25/243 137/628 |
| 3,098,506 A | 7/1963 | Spragens |
| 3,930,434 A * | 1/1976 | Hunter ................... G05B 19/46 137/624.18 |
| 4,570,663 A * | 2/1986 | Gould ................... F16K 11/166 137/119.07 |
| 5,150,883 A * | 9/1992 | Cook-Martin ........... F16J 15/32 251/366 |
| 6,289,668 B1 | 9/2001 | Meier |
| 6,959,728 B2 * | 11/2005 | McCombs .............. F16K 11/14 137/596.1 |
| 8,122,906 B2 * | 2/2012 | Revheim ................. E21B 33/05 137/624.18 |
| 2011/0277480 A1 | 11/2011 | Aboujaib |
| 2015/0308577 A1 | 10/2015 | Aboujaib |
| 2016/0341428 A1 | 11/2016 | Aboujaib |

* cited by examiner

*Primary Examiner* — Craig Schneider
*Assistant Examiner* — Kevin Barss
(74) *Attorney, Agent, or Firm* — Eversheds Sutherland (US) LLP

(57) ABSTRACT

A multi-way valve includes an outer casing provided with an internal cavity, at least one input to the cavity, at least one output from the cavity, the at least one input having sealing means, and an actuator adapted to cause the opening of the sealing means of the inputs. A cross-section of the actuator is smaller than a cross-section of the inner cavity.

14 Claims, 4 Drawing Sheets

MULTI-WAY VALVE

TECHNICAL FIELD

The present application and the resultant patent relate generally to the field of valves intended for enabling the passage of fluids toward a combustion chamber in turbomachinery such as a gas turbine engine and more particularly relate to a multi-way valve for use therewith.

BACKGROUND OF THE INVENTION

In general, a gas turbine needs several fluids for start-up and maintenance. First of all, a combustible gas or a liquid fuel may be injected into a combustion chamber, wherein it is mixed with compressed air and burned. A water injection also may be required to reduce nitrogen oxides (NOx) and the like generated during operation of the gas turbine. In addition, the water injection may be used to purge in order to evacuate residual combustible fluids in the circuits of the gas turbine, for instance after changing liquid fuel operation to gas fuel operation or when stopping the gas turbine. Air also may be injected into the combustion chamber for purging or for sweeping or cooling the nozzles when they are no longer feed with liquid fuel during gas fuel operation and the like. In order to regulate the selective passage of one or several of these fluids, it is necessary to position a multi-way valve upstream of the combustion chamber.

In addition, liquid fuel operation may increase generation of NOx emissions. Thus, a gas turbine may be provided with two separated injection circuits, a primary circuit and a secondary circuit, which may enable a reduction of NOx emissions by an injection of liquid fuel at partial load operation and at nominal load. The gas turbine can in that way operate according a first mode wherein only the primary circuit is fed with a combustible fluid. This mode may be used for start-up, acceleration, and part load operation for a limited preselected combustion temperature. According to a second operation mode, the primary and the secondary circuits may be feed at the same time. This mode may be used for partial load operation limited until full load, between the two preselected combustion temperatures or another combustion parameter such as the dynamic pressure in the combustion chamber. Thus, it may be necessary to manage the opening and closing of each circuit, in particular the inlet and outlet of each one, in order to provide these different operation modes of the combustion chamber in the gas turbine.

Using the liquid fuel may require the water purge and the air sweeping steps in the turbine circuits, as mentioned above. In addition, the stagnant liquid fuel tends to solidify in the presence of air and hot temperatures in a process known as cokefaction. As such, it is important to execute these steps before and after any change between liquid or gas fuels and during gas turbine shutdown. In order to reduce the volume of residual liquid fuel it is necessary to place a distribution valve as closer as possible to the combustion chamber so as to avoid a sudden increase in the power output due to a volume of fuel sent to the combustion chamber during the purge, also known as power output step.

Up until now, several types of multi-way valves have been developed. U.S. Pat. No. 6,289,668 describes in particular a solution based on a rotating mechanism that enables a selective feeding of a liquid combustible and/or water in a combustion chamber. The multi-way valve disclosed includes two concentric cylinders with an inner cylinder mounted for rotation inside an outer cylinder. Depending on the position of the inner cylinder about the rotational axis, the surface of the inner cylinder blocks circuit openings into the outer cylinder or unblocks these openings through slots provided in the surface. This arrangement of elements enables a selective flow of several fluids by rotation of the inner cylinder. This mechanism, however, may cause metal friction between the two cylinders that may result in a significant torque to be applied and a quick wearing of the cylinders such that a risk of leaks between the ports may be increased.

U.S. Pat. No. 3,098,506 also discloses a multi-way valve that includes a housing and a movable actuator. Means for tightness, which includes two deformable sleeves made of a polytetrafluoroethyle (PTFE) polymer, may be placed between the housing and the movable actuator. The material of the sleeves prevents friction therebetween. An effective seal may be maintained between the movable actuator and the housing by a pair of deformable sleeves that serve both as effective bearings for the actuator and as an effective seal between the actuator and the housing. These deformable sleeves may be separated by a relatively rigid intermediate member. The effectiveness of the seal afforded by the deformable sleeves may be controlled by means which apply axial forces against the outer edges of the deformable sleeves so as to compress each of the deformable sleeves against the intermediate rigid member while still serving as effective bearings for the common actuator arrangement. However, this arrangement also may provide a significant torque to the movable actuator to overcome the friction between the housing and the movable actuator. In addition, this arrangement also may require manual operation to maintain a continuous seal.

Thus, one of the aims of the application herein is to overcome these drawbacks by providing a multi-way valve having a reliable mechanism that is easy to manufacture and avoids an increase in the torque supplied to the actuator over time.

SUMMARY OF THE INVENTION

The present application and the resultant patent provide a multi-way valve. The multi-way valve may include a housing provided with an internal cavity, a fluid inlet port, an outlet port, means for sealing the inlets, and a rotating actuator placed in the internal cavity and which is apt to open these means for sealing when they are in a closed state. Furthermore, the cross-section of the rotating actuator may be smaller than the cross-section of the internal cavity so as to overcome any friction between the housing and the actuator.

Advantageously, the opening of the at least one sealing means may be realized by a projecting element placed on the actuator. Even more advantageously, several projecting elements may be positioned around a rotational axis of actuator, in an orthogonal plane. Thus, it may be possible to provide several operational positions for the valve depending on the position of the actuator around its own rotational axis.

Preferably, at least one of these projecting elements may have a cam shaped to cooperate and open a sealing means. The cam shaped element may open the sealing means by rotation of the actuator. At least one of the sealing means that may be placed in the ports may include a check valve that provides a reliable means for closing/opening the inlet port. In another embodiment, at least one outlet port may include a sealing means for closing/opening the outlet port. Advantageously, the sealing means of the at least one outlet port may include a check valve.

In addition, the actuator may be rotating and may be driven by means of a torque generator that may be placed at one of end of the housing. Thus, the space required for operation of the actuator acting over the inlet/outlet ports in the housing also may be reduced. In preference, the housing may include a second internal cavity intended to flow a cooling fluid agent for cooling the elements included in the valve body including the fluids passages.

According to another characteristic of the invention, the valve may include an inlet port connected to a liquid fuel source supply, an inlet port connected to an air source supply, and an inlet port connected to a water source supply. Therefore, it is possible to control easily the flow of fluids toward the combustion chamber for every combustion operation mode of the turbine.

Advantageously, the housing may include two outlet ports. Thus, according to combustion operation mode to be considered, one or two nozzles may be supplied with fluids. For instance, one primary circuit and one secondary circuit that may be used for a NOx reduction combustion mode. More advantageously, a second housing may be juxtaposed to the first housing with the actuator of the first housing extending in the second housing. In this way, it may be possible to control the fluid passage to multiple injectors, for example, a primary circuit and a secondary circuit. Moreover, the presence of a single common actuator simplifies the control of the opening and closing of the inlets and the outlet ports of the two housings. Preferably, at least one inlet port of the second housing may be connected to the supply source that is connected to the inlet port in the first housing so as to allow reducing the space taken up at the periphery of the valve by the supply circuits of the inlet ports.

BRIEF DESCRIPTION OF THE DRAWINGS

Other objects, advantages, and features of the invention will be described in detail, which is given purely for illustration and with reference to the accompanying drawings.

DETAILED DESCRIPTION

Figure 1:
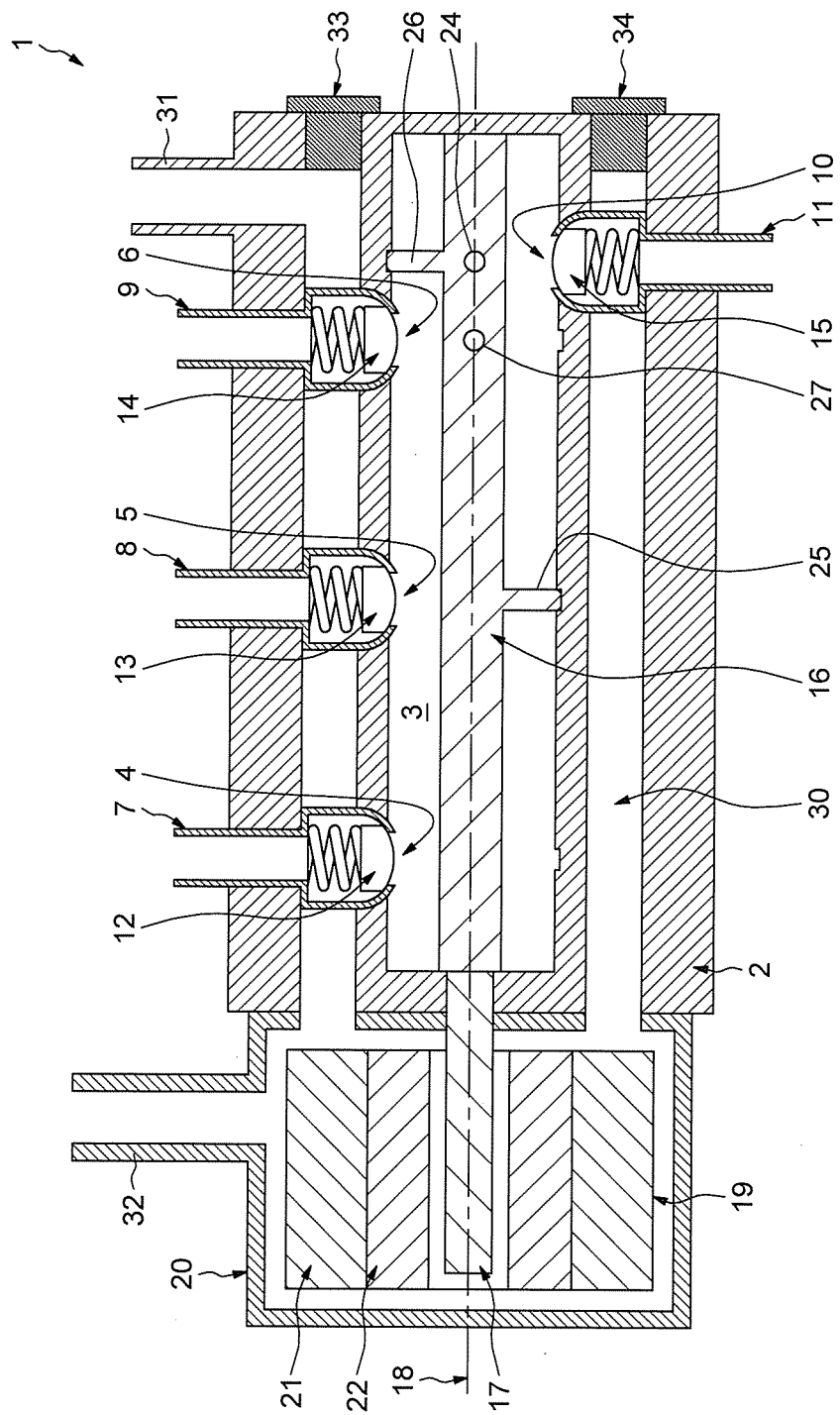
FIG. 1 is a cross-sectional view of a multi-way valve according to a first embodiment of the invention with the inlet port and the outlet port being shown in the closed state, allowing no fluid communication.
Figure 2:
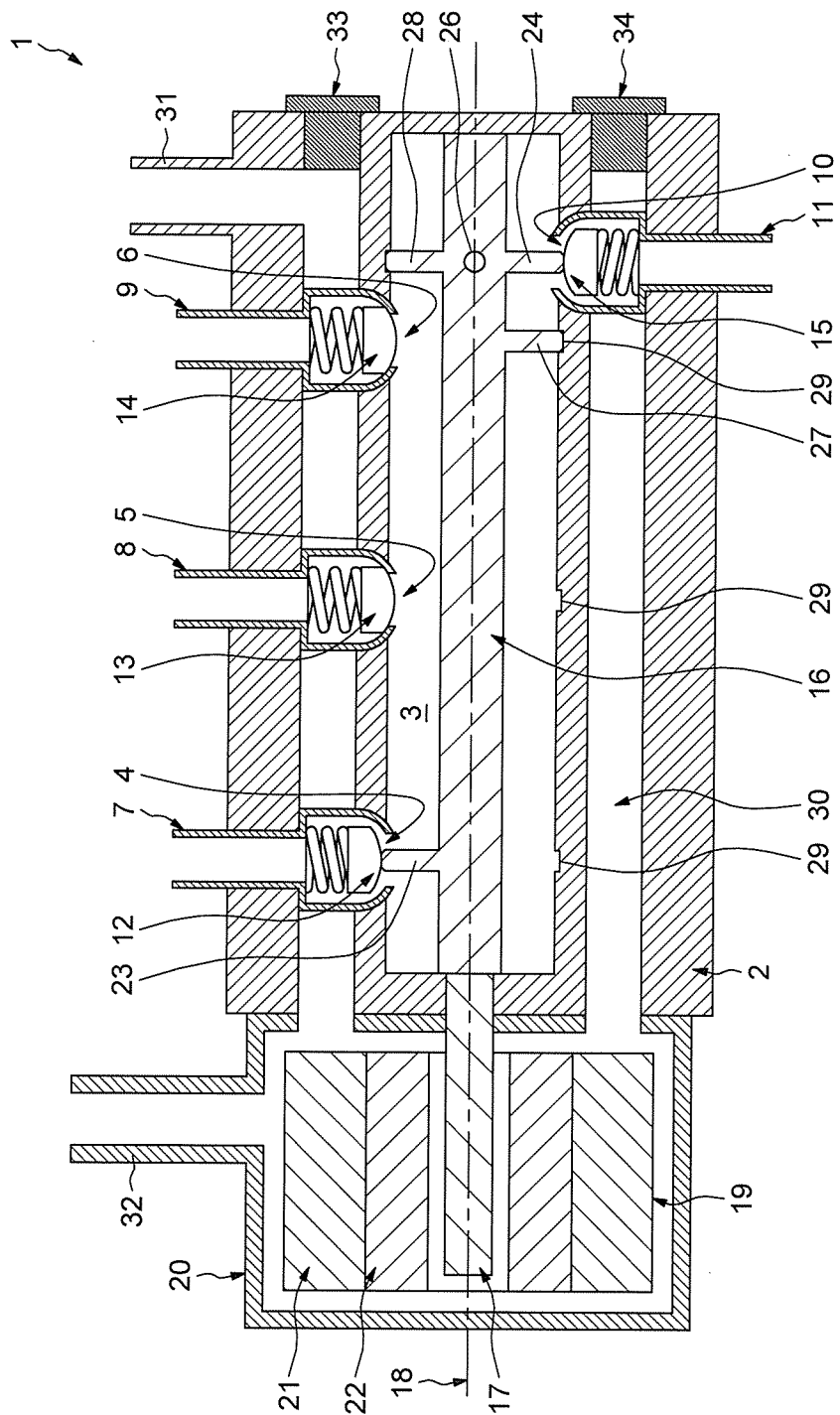
FIG. 2 is a cross-sectional view of a multi-way valve according to the embodiment shown in FIG. 1, illustrating a state of the valve allowing fluid communication between the inlet port and the outlet port as illustrated.

FIGS. 1 and 2 illustrate, as an example, a multi-way valve according to the invention designated by the general reference as 1. In the illustrated example, the multi-way valve 1 may be arranged near a combustion chamber (not shown) of a gas turbine.

The multi-way valve 1 according to the invention may include an outer housing 2 in which is formed an internal cavity 3. As is illustrated, the housing 2 may include the cavity 3 having three inputs 4, 5, and 6 for fluids, each preferably connected to inlet ports, respectively 7, 8, and 9, that are connected to feed supply circuits. Preferably, the inlet port 7 connected to the input 4 is supplied with liquid fuel, the inlet port 8 connected to the input 5 is supplied with water, and the inlet port 9 connected to the input 6 is supplied with air. The outer housing 2 may include more or less than these three inlet ports.

In the illustrated example, the housing 2 having the internal cavity 3 may include a fluid output 10 connected to an outlet port 11. The fluid output 10 advantageously may be in fluid communication with a nozzle by means of the outlet port 11, not shown, for injecting fluid into the combustion chamber.

The inputs 4, 5 and 6 and the output 10 as illustrated are open out to the internal cavity 3. In order to reduce the size of the device in the immediate vicinity of the combustion chamber, in this example, the inlet ports may be arranged such that they are aligned and arranged in the same plane of the outlet ports 10 with the inlet ports being arranged on one side of the cavity 3 and the output port on an opposite face. However, it is also possible to consider another arrangement for the inlet ports or the outlet ports such that they are not aligned or disposed in the same plane.

A number of sealing means 12, 13, and 14, which are in a closed state, are arranged in the inputs 4, 5, and 6. Advantageously, these sealing means may include a check valve. However, in another embodiment, the sealing means may include a spring valve or any other suitable means being operable from the closed state to the open state, opening the input to the cavity of the inlet port.

As illustrated, the output 10 of the cavity also may include a sealing means 15 which is in a closed state. In addition, the sealing means 15 may include a check valve. Such a device may avoid recirculation of fluid to the inlet ports of the valve through the inputs, particularly in the case where the inlet ports 7, 8, and 9 have different pressures. Indeed, the pressure required to open the check valves 15 of the output is preferably chosen to be less than the minimum opening pressure of the check valves of the inputs. Thus, the check valve may prevent the return of fluids between the inlets ports due to static pressure generated in the internal cavity. Similarly to the inputs in the cavity, the output may be provided with sealing means that may include a spring valve or other suitable means.

A rotating actuator 16, adapted to cause the opening of the sealing means of the inlets 4, 5, and 6, may be disposed in the inner cavity 3. In addition, the cross-section of the actuator 16 may be chosen to be smaller than the cross-section of the internal cavity 3. In preference, the actuator 16 may include a rotating shaft 17 that extends along an axis 18. In the illustrated example, the rotating actuator 16 may be connected to a torque generator 19 arranged outside the housing 2 and at one of its ends, by means of the shaft 17. The shaft 17 sealingly extends through the housing 2. Preferably, the torque generator 19 may be disposed in a housing 20 juxtaposed or close to the outer housing 2. In addition, the torque generator 19 shown may be of the electric type, including a stator 21 and a rotor 22. Alternatively, the torque generator 19 may be mechanical, hydraulic, or pneumatic.

In FIG. 1, inputs 4, 5, and 6 are in the closed state, as well as the outlet 10, with their respective check valves. In this position, no fluid communication may be possible between one of the inlets 4, 5, 6 and the output 10 in the cavity. Inversely, FIG. 2 illustrates a fluid communication between the inlet port 7 and the outlet port 11 through the inlet 4 and the outlet 10 of the cavity. In the example illustrated, the shaft 17 of the actuator 16 may include a number of projecting elements 23, 24, 25, 26, 27, and 28. The projecting elements 23 and 24 are respectively disposed facing the inlet 4 and the output 10 so as to lead to a change in the condition of sealing means. The projecting elements 23 and 24 cooperate with the respective sealing means 12 and 15 so as to open the input 4 and the output 10 and maintain it in opened state.

The position of each projecting member in the rotating actuator is chosen so as to open selectively an inlet port or an output port, by rotation, clockwise or counterclockwise, of the actuator 16. For example, the projecting element 25 causes the opening of sealing means of the inlet 5 from the closed state and the projecting element 27 causes the opening of the sealing means 14 of the inlet port 6 from the closed state. As illustrated, several projecting elements 24, 26 and 28 may be positioned around the axis of rotation 18 of the actuator 16 in a orthogonal plane with respect to the axis of rotation 18 of the actuator 16. In this example, the orthogonal plane passes through the center of 10 and sealing means 15.

The number and distribution of the projecting elements in the actuator 16 determines the number of operating positions of the valve with each position being a function of the position of the actuator 16 around its axis of rotation 18. The first illustrated embodiment provides, for example, four positions of operation of the valve. A rotation of about ninety degrees 90° switches successively from one position to the next. Of course, it is possible to communicate with at least two inlet ports with the outlet by positioning projections of the rotating actuator in parallel so as to face the respective input and output in the cavity.

The first position, illustrated in FIG. 1, wherein no projecting element is arranged facing the sealing means, does not allow any fluid connection between the inlet ports and the outlet ports through the inlet and the outlet in the cavity. This position may be required when, for example, stopping the operation of the gas turbine.

The second position, illustrated in FIG. 2, wherein the projecting elements 23 and 24 are respectively facing the sealing means 12 and 15 so as to cause the simultaneous opening of the inlet 4 and the outlet 10 in the cavity 3 and, therefore, a fluid communication between the inlet port 7 supplied with fuel and the outlet port 11. The illustrated method allows fuel to flow to the injector into the combustion chamber (not shown) to which the outlet port 11 may be connected. Such a position allows, for example, operation with the fuel of the turbine.

In a third position, not illustrated, the projecting elements 25 and 26 may be respectively disposed facing the input 5 and the output 10 in the cavity 3. This position of the actuator 16 may allow water passage from the inlet port 8 to the outlet port 11 through the cavity 3, for example, during a water purge of the circuits of the turbine after stopping the flow of fuel such as fuel oil.

In a fourth position, not illustrated, wherein the projecting elements 27 and 28 are arranged, respectively, facing the sealing means 14 and 15 so as to allow the passage of air from the input 6 to the output 10 through the cavity 3. In this position, it may be possible to operate the turbine with fuel gas. The flow of air then may cool the injectors, while an independent connection external to the valve, not shown, may supply gaseous fuel into the combustion chamber for operation in the gas turbine. In a variant, this independent connection, external to the valve 1, also may be included in the valve 1 through additional inlet port or being common to the air input 6.

Preferably, the projecting elements may be the cams that cooperate with the sealing means, for instance a check valve. However, it may be provided that the projecting elements differ from those shown by their nature, their form, or their material, provided that they are capable of activating the sealing means when they are in the closed state and opening the input and the output in the cavity 3. In addition, the projecting elements advantageously may be selected so as to reduce the force or friction between the sealing means, for example, they can be designed in a polytetrafluoroethylene (PTFE) and similar types of materials. Advantageously, the housing 2 may include grooves 29 arranged facing the internal cavity 3 for the passage of the projecting elements during rotation of the actuator 16.

In addition, the illustrated valve includes a second cavity 30, intended for the circulation of a cooling fluid such as water in order to maintain a constant temperature in the valve 1. An increase in the temperature may be generated, for example, by the proximity of the valve to the combustion chamber. The cavity 30 may be formed in the housing 2 and extend to the casing 20 such that the cooling fluid may circulate near the inlets 4, 5, and 6, the output 10, and the torque generator 19. As is illustrated, the cavity 30 opens, advantageously, at an inlet port 31 and an outlet port 32, being located respectively in the housing 2 and the housing 20. A number of sealing means 33 and 34, such as plugs, may be disposed on the circuit of the coolant in order to seal the cavity 30.

Figure 3:
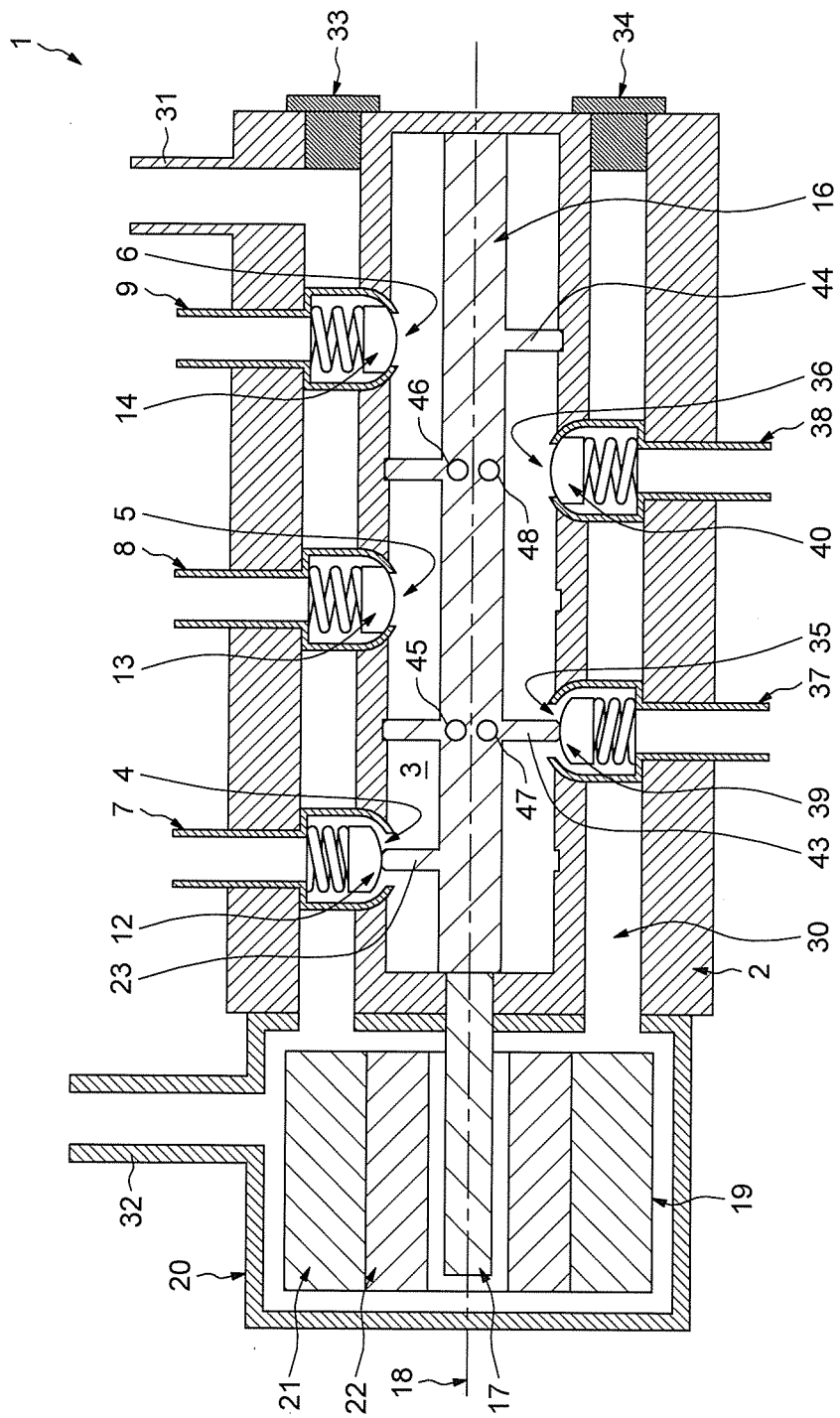
FIG. 3 is a cross-sectional view of a multi-way valve according to a second embodiment of the invention.

FIG. 3 illustrates a second embodiment of a multi-way valve according to the invention adapted for operation of the turbine by multi-injectors, for reducing NOx emissions. In this mode, the valve may include two outputs 35 and 36 in the cavity 3, for the passage of a fluid. For example, a fluid needed to feed a primary circuit and a secondary circuit, one for ignition of the turbine and the other for the continuous operation of the turbine. The outer housing 2 may include more than two outlets ports. The valve elements 1 described in FIGS. 1 and 2 may be identical to the elements of the valve 1 described in FIG. 3 having similar references. The valve illustrated in this second embodiment may have six operating positions which are functions of the position of the actuator 16 relative to its axis of rotation 18. In this example, a rotation of about sixty degrees (60°) allows passage successively from one position to the next.

The first position, illustrated in FIG. 3, wherein the projecting elements 23 and 43 are respectively facing the sealing means 12 and 39, causes the simultaneous opening of the input 4 and the output 35 in the cavity and thus causes a fluid flow between the input 4 supplied with fuel, such as oil, and the output 35 in the cavity. Thus, a single injector circuit may be supplied with liquid fuel when, for example, required for ignition of the turbine.

In a second position, not illustrated, the projecting elements 47 and 48, as well as another element not shown in FIG. 3, may be oriented in the opposite direction of the elements 47 and 48 and may be respectively disposed facing the sealing means 39, 40, and 12. This position may allow the fuel passage, such as oil, from the inlet 4 to the output 35 and 36 in cavity and thus simultaneously feeds two circuits to the combustion chamber injectors, for example, for operation of the turbine with the liquid fuel.

In a third position, not illustrated, the projecting elements 45 and 46 and a non-visible element in FIG. 3, which may be arranged and oriented in the opposite direction of the elements 45 and 46, respectively, facing the sealing means 39, 40, and 13. This position of the actuator 16 may provide a water passage from the inlet 5 to the outputs 35 and 36 through the cavity 3. This operation allows, for example, cleaning the circuits of the valve 1 and the injectors before changing over from liquid to gas fuel and may prevent the solidification of the fuel caused by air and heat close to the combustion chamber.

A fourth position, wherein the projecting element 44 as well as two non-visible elements in FIG. 3 may be oriented in the opposite direction of the element 44, and arranged respectively, facing the sealing means 14, 39, and 40. This position allows an air passage from the input 6 to the output 35 and 36 and thus supplies air simultaneously to the two injectors of the combustion chamber. The air passage then may cool the injectors continuously, while an independent connection, external to the valve, not shown, may supply gaseous fuel into the combustion chamber for operation in the gas turbine.

The last two positions, where no projecting element is located facing the sealing means, do not allow any fluid communication between the input 4, 5, 6 and the output 35, 36 of the valve 1. In this position, combustion in the turbine may be shut down. In this embodiment, it is possible to open at least two inlet ports simultaneously to at least one outlet port.

Figure 4:
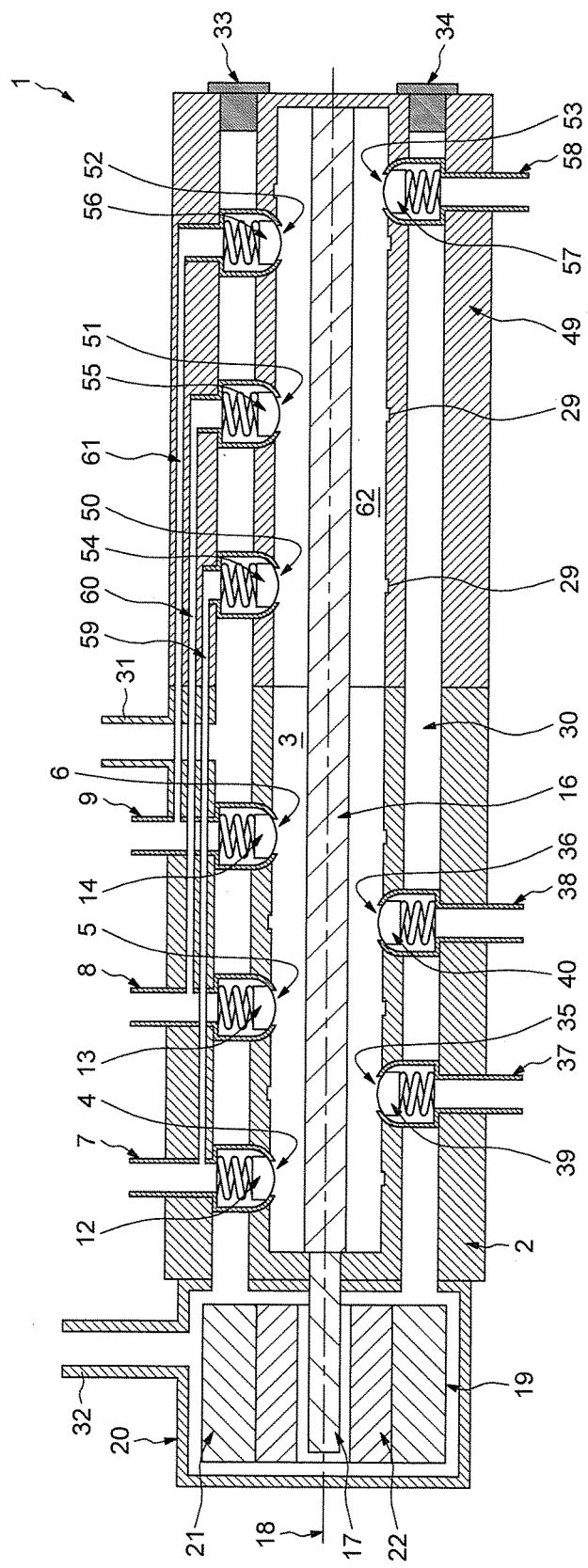
FIG. 4 is a cross sectional view of a multi-way valve according to a third embodiment of the invention.

FIG. 4 illustrates a third embodiment of a valve according to the invention. The valve elements 1 described in FIGS. 1, 2 and 3 may be identical to elements of the valve 1 depicted in FIG. 4 having similar references. Furthermore, the valve 1 may include in this embodiment a second outer housing 49 juxtaposed to the first outer housing 2. An internal cavity 62 may be formed in the second housing 49. Preferably, the actuator 16 of the first outer housing 2 may extend in the second housing 49 and thus may be common to the two casings.

In the illustrated example, the second housing 49 and the cavity 62 include three inlet 50, 51, and 52 and an output 53, respectively including a sealing means 54, 55, 56, and 57 corresponding to a check valve. The inlet 50, intended to be supplied with fuel, preferably may be connected the inlet port 7 of the first outer casing 2, supplied with fuel by a connecting line 59. Similarly, the inputs 51 and 52 may be connected respectively to the inlet ports 8 and 9 supplied respectively with water and air, through the connecting conduits 60 and 61. The output 53 in cavity 62 may be connected to a output port 58.

In this example, the projecting elements of the actuator 16 have not been shown. However, there may be provided a number of the projecting elements on the actuator 16 such as, for example, in which the rotating actuator 16 may provide at least seven positions of operation of the valve 1. Of these positions, it may be provided that a position does not open any of the inlet and the outlet ports upon stopping the combustion of turbine.

According to a second position, it may be provided that the actuator 16 simultaneously opens the input 4 and the output 35 in the cavity 3 by using a projecting element facing the respective sealing means for passage of fuel, in particular upon ignition of the turbine.

In a third position, the actuator 16 simultaneously may open the input 4 of the first outer casing 2, the input 52 of the second outer housing 49, as well as the three outputs 35, 36, and 53 of the valve 1, for the passage of fuel from the input 4 to the outputs 35 and 36 through the cavity 3 and the passage of air from the input 52 to the output 53 through the cavity 62.

A fourth position may be provided so as to enable the simultaneous opening of the input 4 in cavity 3, the input 50 in the cavity 62, and the outputs 35, 36 in the cavity 3 and in the cavity 62, for the passage of a significant amount of fuel to the injectors of the combustion chamber.

A fifth position of the actuator 16 may be provided for simultaneously opening the inlet 4 in the cavity 3 and the inlet 51 in the cavity 62 and the output 35, 36 in the cavity 3 and in the cavity 62, for the fuel passage input 4 to the outputs 35 and 36 through the cavity 3 and for the water from the inlet 51 to the output 53 through the cavity 62 to produce a water purge in the outer housing 49.

In sixth position, it may be provided for the actuator 16 simultaneously to open the input 5 in the cavity 3 and the input 52 in the cavity 62 and the outputs 35, 36 in the cavity 3 and in the cavity 62, for the input of the water passage 5 to the outputs 35 and 36 through the cavity 3 and for the passage of air from the input 52 to the output 53 through the cavity 62 for the operation of the gas turbine.

In a final position, it may be provided for the actuator 16 simultaneously to open the input 6 in the cavity 3, the input 52 in the cavity 62 and the outputs 35, 36 in the cavity 3 and the cavity 62 for the passage of air from the input 6 to the outputs 35 and 36 through the cavity 3 and for the passage of air from the input 52 to the output 53 through the cavity 62 for the operation of the gas turbine. According to the use and operating positions of the valve 1, the number and the position of each projecting member as well as the number of inlets and/or outlets with their respective input/output to and from the cavity opened simultaneously may vary.

In this third embodiment, a blind flange may be provided in the housing 2 on the opposite side to the generator 19. Thus, in order to add another body such as the housing 49, the connecting flange of the housing 49 may be mounted instead of the blind flange to secure the two housings 2 and 49. It is also possible to have connection flanges in the body 49 to the opposite extreme to the generator 19 so as to add additional housing inlet and outlet ports to allow more combinations and functions associated with the valve 1 while keeping a single actuator 16. For example, adding a housing with ports for the passage of the gaseous fuel. According to another embodiment, both housings 2, 49 of the multi-way valve according to the invention may include not one but several internal cavities 3, 62, each one including one or more inputs and outputs.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A multi-way valve, comprising:
   an outer casing provided with an internal cavity;
   at least one input and at least one output in the internal cavity;
   the at least one input comprising sealing means;
   an actuator disposed in the internal cavity and adapted to cause the opening of the sealing means; and
   wherein a cross-section of the actuator is smaller than a cross-section of the internal cavity; and
   wherein the outer casing comprises a second cavity for circulating a cooling fluid.

2. The multi-way valve according to claim 1, wherein the opening of the sealing means is caused by a projecting element disposed on the actuator.

3. The multi-way valve according to claim 2, wherein a plurality of projecting elements is positioned about an axis of rotation of the actuator and in a plane orthogonal to the axis.

4. The multi-way valve according to claim 3, wherein at least one of the plurality of projecting elements is a cam adapted to move the sealing means with which it cooperates.

5. The multi-valve according to claim 1, wherein the sealing means comprises a check valve.

6. The multi-way valve according to claim 1, wherein the at least one output comprises an output sealing means acted upon by the actuator.

7. The multi-way valve according to claim 6, wherein the output sealing means comprises a check valve.

8. The multi-valve according to claim 1, wherein the actuator is rotatable and is connected to a torque generator disposed about the outer casing.

9. A multi-way valve, comprising:
an outer casing provided with an internal cavity;
at least one input and at least one output in the internal cavity;
the at least one input comprising sealing means;
an actuator disposed in the internal cavity and adapted to cause the opening of the sealing means; and
wherein a cross-section of the actuator is smaller than a cross-section of the internal cavity; and
wherein the at least one input comprises a first input connected to a first inlet port for fuel, a second input connected to a second inlet port air, and a third inlet connected to a third inlet port for water.

10. The multi-way valve according to claim 1, wherein the at least one output comprises a first output and a second output.

11. The multi-valve according to claim 1, further comprising a second housing juxtaposed to the outer casing and wherein the actuator extends into the second housing.

12. The multi-way valve according to claim 11, wherein at least one second housing input is connected to the at least one input of the first housing.

13. A multi-way valve, comprising:
an outer casing provided with an internal cavity;
at least one input and at least one output in the internal cavity;
the at least one input comprising a check valve;
an actuator disposed in the internal cavity and adapted to cause the opening of the check valve; and
wherein a cross-section of the actuator is smaller than a cross-section of the internal cavity; and
wherein the outer casing comprises a second cavity for circulating a cooling fluid.

14. The multi-way valve according to claim 13, wherein the at least one output comprises an output check valve.

* * * * *